US007838056B2

(12) United States Patent
Forgac et al.

(10) Patent No.: US 7,838,056 B2
(45) Date of Patent: Nov. 23, 2010

(54) USING CARBON DIOXIDE REGULATORS TO EXTEND THE SHELF LIFE OF A CARBONATED BEVERAGE

(75) Inventors: John M. Forgac, Elmhurst, IL (US); Francis M. Schloss, Perrysburg, OH (US); Matthew A. Kulzick, Warrenville, IL (US)

(73) Assignee: BP Corporation North America Inc., Warrenville, IL (US)

( * ) Notice: Subject to any disclaimer, the term of this patent is extended or adjusted under 35 U.S.C. 154(b) by 1265 days.

(21) Appl. No.: 11/065,850

(22) Filed: Feb. 25, 2005

(65) Prior Publication Data

US 2005/0230415 A1 Oct. 20, 2005

Related U.S. Application Data

(60) Provisional application No. 60/548,286, filed on Feb. 27, 2004, provisional application No. 60/628,737, filed on Nov. 17, 2004, provisional application No. 60/655,806, filed on Feb. 24, 2005.

(51) Int. Cl.
*G01F 11/00* (2006.01)

(52) U.S. Cl. ....................... 426/474; 426/477; 426/561; 426/591

(58) Field of Classification Search ..................... 222/1, 222/394; 426/561, 591, 474, 477
See application file for complete search history.

(56) References Cited

U.S. PATENT DOCUMENTS

| | | | | |
|---|---|---|---|---|
| 6,333 | A | 4/1849 | Andrews et al. | |
| 3,888,998 | A * | 6/1975 | Sampson et al. | 426/67 |
| 4,025,655 | A | 5/1977 | Whyte et al. | 426/66 |
| 4,110,255 | A | 8/1978 | Liepa et al. | 252/455 |
| 4,186,215 | A | 1/1980 | Buchel | 426/86 |
| 4,214,011 | A * | 7/1980 | Strube | 426/591 |
| 4,664,922 | A | 5/1987 | Leon et al. | 426/124 |
| 5,182,084 | A | 1/1993 | Plester | 422/105 |
| 5,350,587 | A | 9/1994 | Plester | 426/394 |
| 5,615,791 | A * | 4/1997 | Vatelot et al. | 215/382 |
| 5,855,942 | A | 1/1999 | Rule | 426/395 |
| 5,992,700 | A * | 11/1999 | McGlothlin et al. | 222/187 |
| 6,852,783 | B2 | 2/2005 | Hekal | 524/320 |
| 2002/0173572 | A1 | 11/2002 | Hekal | 524/401 |
| 2004/0242746 | A1 | 12/2004 | Freedman et al. | 524/424 |

FOREIGN PATENT DOCUMENTS

RU 2018983 * 8/1994

* cited by examiner

*Primary Examiner*—Anthony Weier
(74) *Attorney, Agent, or Firm*—Joseph DiSalvo; Robert N. Carpenter

(57) ABSTRACT

A method for replenishing carbon dioxide gas in a carbonated beverage container where a carbon dioxide regulator releases carbon dioxide at a rate approximately equal to the rate of carbon dioxide loss from said container. Also shown is a packaging system for maintaining a consistent pressure of a carbonated beverage having a closure, a plastic container, and a carbon dioxide regulator. Also shown is a method for making a packaging system for maintaining a consistent pressure in a carbonated beverage having overmolding a preform around an assembly for a carbon dioxide regulator, or blending a carbon dioxide regulator into the plastic material used to form the body of a container for said carbonated beverage. Also shown is a carbon dioxide regulator composition for replenishing carbon dioxide gas in a carbonated beverage container having polymeric carbonates, organic carbonates, or materials that absorb and subsequently release carbon dioxide.

10 Claims, 10 Drawing Sheets

Regulator Cap Assembly with Regulator Disk and Liner

Effect of Molecular Sieve Regulator on Pressure in a PET Beer Bottle

Effect of Molecular Sieve Regulator on Pressure in a PET Carbonated Soft Drink Bottle Regulator Cap Assembly with Regulator Disk and Liner Regulator Cap Assembly with Regulator Disk and Liner

Regulator Cap with Plug-Cup Assembly

Regulator Insert Assembly

Organic Carbonate $CO_2$ Yield Activated by Water Vapor at Room Temperature

Effect of Materials on the Rate of Carbon Dioxide Release

Effect of Bicarbonate Filled Cup on Internal Bottle Pressure

Pressure Change in 20 Ounce PET Bottle

USING CARBON DIOXIDE REGULATORS TO EXTEND THE SHELF LIFE OF A CARBONATED BEVERAGE

CROSS-REFERENCE TO RELATED APPLICATIONS

This application claims priority to provisional patent Appl. No. 60/548,286, filed Feb. 27, 2004, and to provisional patent Appl. No. 60/628,737, filed Nov. 17, 2004, and to provisional patent application No. 60/655,806 titled "Using Carbon Dioxide Regulators to Extend the Shelf Life of Plastic Packaging" filed Feb. 24, 2005.

BACKGROUND OF THE INVENTION

Plastic and metal containers have been replacing glass in bottling beverages where easy handling, low weight and non-breakability are needed. Plastic packaging, especially polyethylene terephthalate (PET) bottles, are widely used for the packaging of carbonated products such as beer, soft drinks, still waters and some dairy products. For each of these products there is some optimum amount of carbonation or carbon dioxide (sometimes referred to in this document as "$CO_2$") pressure within the package to maintain its optimum quality. In conventional plastic packaging, it is difficult to maintain the $CO_2$ pressure at this optimum level for an extended period of time.

Plastic packaging is permeable to $CO_2$ and over time the pressure within the bottle diminishes. Ultimately, after a defined amount of carbonation is lost, the product is no longer suitable for use which is usually determined by a noticeable and unacceptable change in flavor or taste. The point at which this occurs generally defines the shelf-life of the package. The $CO_2$ loss rate is highly dependent on the weight and dimensions of the package and on the temperature at which it is stored. Lighter, thinner bottles lose carbonation more quickly, cannot withstand high internal pressures, and have shorter shelf-lives. As plastic bottles become smaller, the relative rate of carbonation loss becomes more rapid. Permeation is faster at higher temperatures, reducing shelf-life, and making it difficult to store carbonated beverages in plastic containers in hot climates and still maintain a reasonable shelf-life. Longer shelf-life, lighter, less expensive plastic bottles, and the ability to store bottles longer in the absence of cooling have numerous economic advantages.

A variety of approaches have been applied to the problems described above. A simple method for extending the shelf-life of a carbonated beverage is to add additional carbon dioxide at the point of filling. This is currently used for carbonated soft drinks and for beer, but its effectiveness is hindered due to the effect of the over-carbonation on product quality and the negative effects that this can cause on the bottle's physical performance. Small differences in internal pressure within the package cause significant differences in the effervescent qualities of the beverage. Dissolved $CO_2$ also effects taste. These precise requirements vary from product to product.

Over-carbonation is also hindered by the pressure limitations of the package. Making the bottle more pressure resistant is possible but requires use of additional material in the bottle construction or more exotic higher performing plastics.

Carbonation can be maintained by reducing the $CO_2$ permeation rate. This typically involves application of a secondary barrier coating to a PET bottle, use of a more expensive, less permeable polymer than PET, fabrication of multilayer bottle constructions, or combinations of these methods. These manufacturing approaches are invariably significantly more expensive than what is incurred in typical polyester bottle production and often these create new problems especially with recycling.

Carbon dioxide generating materials have been used in the art to extend the shelf life of carbonated beverages. Molecular sieves treated with carbon dioxide have been used to carbonate beverages by the reaction of the bound carbon dioxide with water.

U.S. Pat. No. 6,852,783 issued to Hekal and U.S. Patent Application 2004/0242746 A1 to Freedman et al. describes a $CO_2$ releasing composition that can be incorporated or inserted into the packaging for carbonated beverages. The compositions in these references describe over twenty-five percent by weight of inorganic carbonate as the source of the carbon dioxide blended into the thermoplastic. A 32 g PET bottle with a 25% loading of sodium bicarbonate has the potential to release 4.5 grams of carbon dioxide. This is approximately ten times higher than needed for application in a PET beer bottle and would likely cause an unsafe pressurization of the package. These structures also release their carbon dioxide too quickly to regulate pressure over a prolonged period especially if they were prepared in polyethylene terephthalate as opposed to polyethylene which has a far lower permeation rate for moisture. We have found such high loading levels to be unsuitable for our application since they have the potential to release far too much carbon dioxide into the package.

SUMMARY OF THE INVENTION

This invention is directed to a method for replenishing carbon dioxide gas in a carbonated beverage container. The method comprises inserting a carbon dioxide regulator into the beverage container or into a closure of the container, and releasing carbon dioxide from said carbon dioxide regulator via a chemical reaction. The release of the carbon dioxide is regulated at a rate approximately equal to the rate of carbon dioxide loss from said container.

This invention is also directed to a method for replenishing carbon dioxide gas in a carbonated beverage container. The method comprises inserting a carbon dioxide regulator into the container or into a closure of the container; and subsequently regulating the release of the carbon dioxide from the carbon dioxide regulator at a rate approximately equal to the rate of carbon dioxide loss from said container.

This invention is also directed to a packaging system for maintaining a consistent pressure of a carbonated beverage comprising a closure, a plastic container, and a carbon dioxide regulator.

This invention is also directed to a method for making a packaging system for maintaining a consistent pressure in a carbonated beverage comprising overmolding a preform around an assembly for a carbon dioxide regulator.

This invention is also directed to a method for making a packaging system for maintaining a consistent pressure in a carbonated beverage comprising blending a carbon dioxide regulator into the plastic material used to form the body of a container for said carbonated beverage.

This invention is also directed to a carbon dioxide regulator composition for replenishing carbon dioxide gas in a carbonated beverage container comprising polymeric carbonates and organic carbonates, individually, or in combinations thereof.

This invention is also directed to a carbon dioxide regulator composition for replenishing carbon dioxide gas in a carbonated beverage container comprising materials that absorb and subsequently release carbon dioxide.

A "carbonated beverage" as used herein is an aqueous solution in which carbon dioxide gas, in the range of about 2 to about 5 vol $CO_2$/vol $H_2O$, preferably about 3.3 to about 4.2 vol $CO_2$/vol $H_2O$ for carbonated soft drinks, and about 2.7 to about 3.3 vol. $CO_2$/vol $H_2O$ for beer, has been dissolved.

"Carbon dioxide regulator," as used herein, is a composition that acts to maintain a more constant carbon dioxide pressure within a package for a period of time by either slowly releasing $CO_2$ through a controlled chemical reaction process or by adsorbing and desorbing $CO_2$ through a physical process where the rate of this release is approximately equivalent to the $CO_2$ loss rate of the package.

Suitable $CO_2$ regulators include: polymeric carbonates, cyclic organic carbonates, organic carbonates such as alkyl carbonate, ethylene carbonate, propylene carbonate, polypropylene carbonate, vinyl carbonate, glycerine carbonate, butylene carbonate, diethyl carbonate, ethyl pyrocarbonate, methyl pyrocarbonate, dialkyl dicarbonate, or mixtures thereof; inorganic carbonates such as sodium bicarbonate, ferrous carbonate, calcium carbonate, lithium carbonate and mixtures thereof; molecular sieves, zeolites, activated carbon, silica gels and coordination polymers, metal organic frameworks ("MOF's"), and isoreticular metal-organic frameworks (IRMOF's). The amount of $CO_2$ regulator utilized is dependent upon the amount of carbon dioxide release desired which is dependent on the amount of carbon dioxide lost from the container over the shelf-life of the container.

Areas of the bottle in which the $CO_2$ regulator may be placed include, but are not limited to, the bottle closure, the bottle finish/neck, the bottle base, or blended into the plastic resin comprising the bottle.

DETAILED DESCRIPTION OF THE INVENTION

Figure 1:
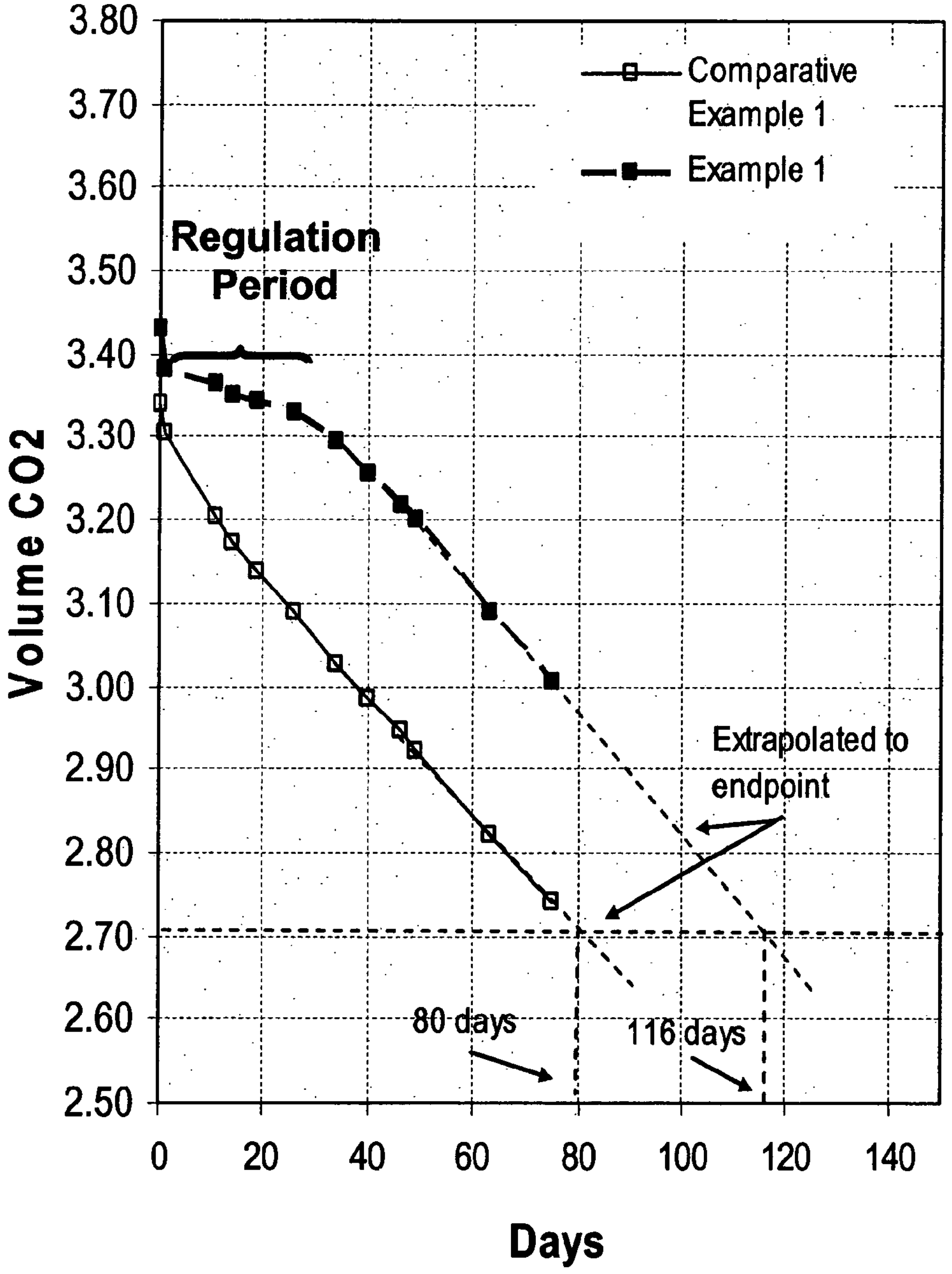
FIG. 1 is a depiction of the effect of a carbon dioxide regulator on the performance of a PET beer bottle.

There are a wide variety of compositions that can serve as carbon dioxide regulators. These compositions fall into two categories. The first category is compositions that generate or release carbon dioxide via a controlled chemical reaction. Such compositions include: a) polymers such as aliphatic polyketones which generate carbon dioxide as a degradation by-product of the polymers reaction with oxygen or organic and inorganic carbonates groups that release carbon dioxide upon hydrolysis, especially in the presence of acids. Catalysts, binders, and other additives may be combined with these materials to help control the carbon dioxide release process; and b) organic carbonates such as alkyl carbonates, ethylene carbonate, propylene carbonate, polypropylene carbonate, vinyl carbonate, glycerine carbonate, butylene carbonate, diethyl carbonate, ethyl pyrocarbonate, methyl pyrocarbonate, cyclic carbonate acrylates such as trimethylol propane carbonate acrylate, and dialkyl dicarbonates which generate carbon dioxide upon hydrolysis that can be enhanced by reaction with an acid such as citric acid or phosphoric acid.

The second category is sorbent compositions that store carbon dioxide and then release it into the container as carbon dioxide is lost from the package. These include: absorbents such as silica gel; molecular sieves, zeolites, clays, activated alumina, activated carbon, and coordination polymers, metal organic frameworks or "MOF's" and isoreticular metal-organic frameworks or "IRMOF's" which are crystalline materials of metal oxide and organic acids analogous to zeolites. These materials may be engineered to have varying pore sizes and carbon dioxide storage capacity.

The various carbon dioxide generators described above may be blended into the polymer that makes up the container or the closure. They can also exist as layers in a multilayer closure, liner, or bottle design. Alternatively, they can be molded into an insert or disc that can be placed in the top of the bottle closure or in an insert which could be placed into the finish area of the container. Some designs are shown in FIGS. 3-6.

In systems where moisture is used to regulate the release rate of $CO_2$, the carbon dioxide regulator can be encapsulated or blended with a suitable polymer selected for its permeability to moisture and $CO_2$. By proper selection of the encapsulating or barrier polymer, the rate of moisture permeation can be used to control the rate of $CO_2$ release and match the $CO_2$ loss rate of the package thereby achieving a package which maintains a near constant internal $CO_2$ pressure for a period of time. This period of time is referred to as the regulation period.

In systems where oxygen is used to regulate the release rate of $CO_2$, the carbon dioxide regulator can be encapsulated or blended into a suitable polymer selected for its permeability to oxygen and $CO_2$. Again, by proper selection, the rate of $CO_2$ generation can be regulated to match the $CO_2$ loss rate of the package and maintain a near constant internal $CO_2$ pressure for a period of time.

When the carbon dioxide regulator is prepared from a $CO_2$ adsorbing material, the additional $CO_2$ needed to extend shelf-life may be incorporated through over-carbonation at the point of filling. The package can be over-carbonated with the precise amount of $CO_2$ needed based upon the desired increase in shelf-life, regulation period, and the $CO_2$ permeability of the package. The $CO_2$ regulating material must rapidly absorb this excess $CO_2$ before the package can deform due to excess $CO_2$. This adsorbance should occur within about six hours and preferably in about one hour. The $CO_2$ regulator should then release the adsorbed carbon dioxide at a rate less than or preferably approximately equivalent to the rate of carbon dioxide loss from the package itself. This will ensure that a uniform and stable internal $CO_2$ pressure is maintained. Performance of specific regulator compositions may be optimized by proper drying, impregnating, and fabricating conditions that are well known to those skilled in the art. It is preferred to minimize the volume of the carbon dioxide regulator so that the space of the package is used efficiently.

Alternatively, the carbon dioxide regulator may be pre-charged with $CO_2$ by subjecting it to an environment of $CO_2$ gas so that it absorbs and holds enough $CO_2$ gas to replace $CO_2$ lost from the container during the normal use of the container.

Figure 3:
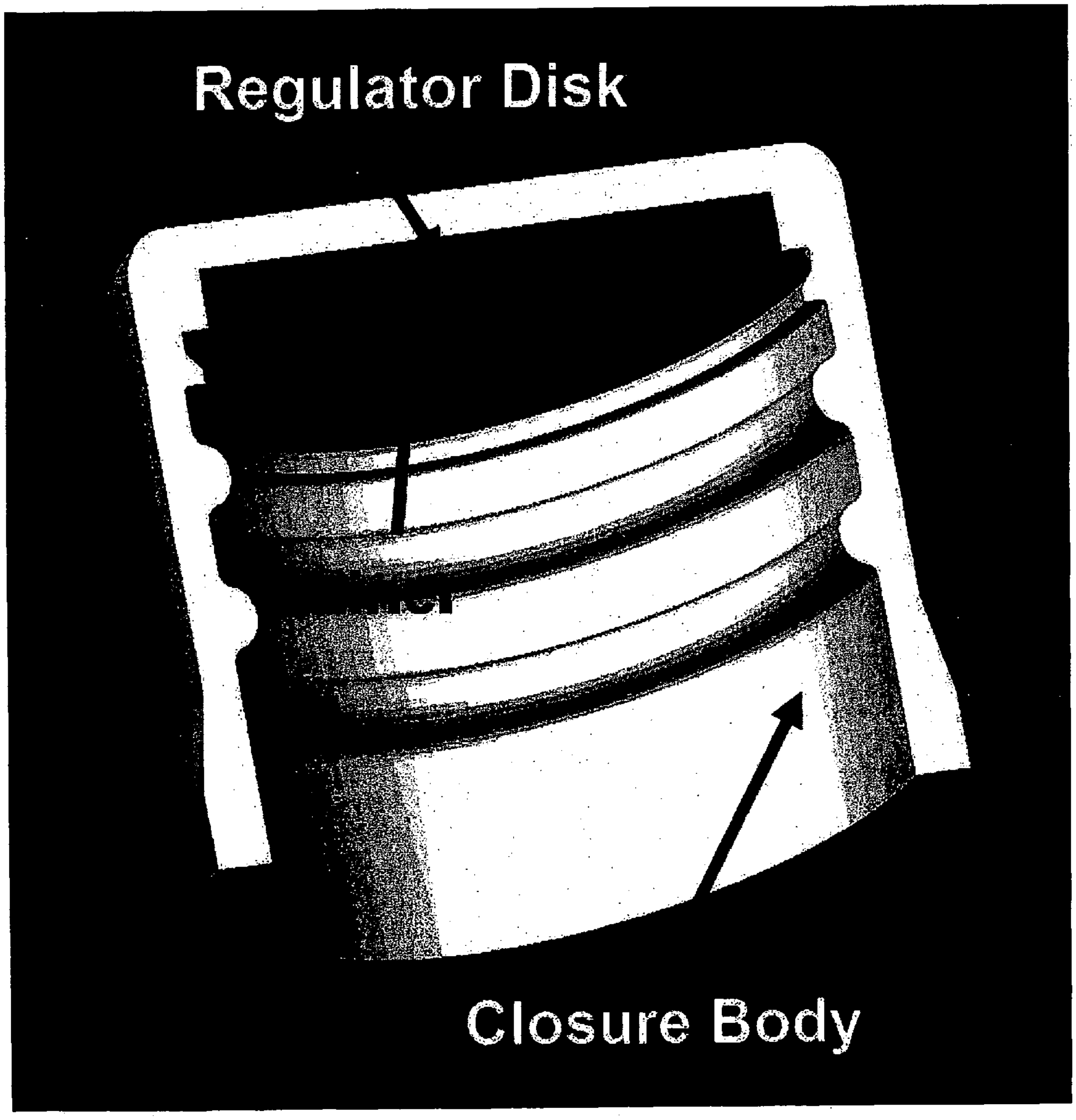
FIG. 3 is a depiction of a carbon dioxide regulator closure with disk insert and liner.
Figure 4:
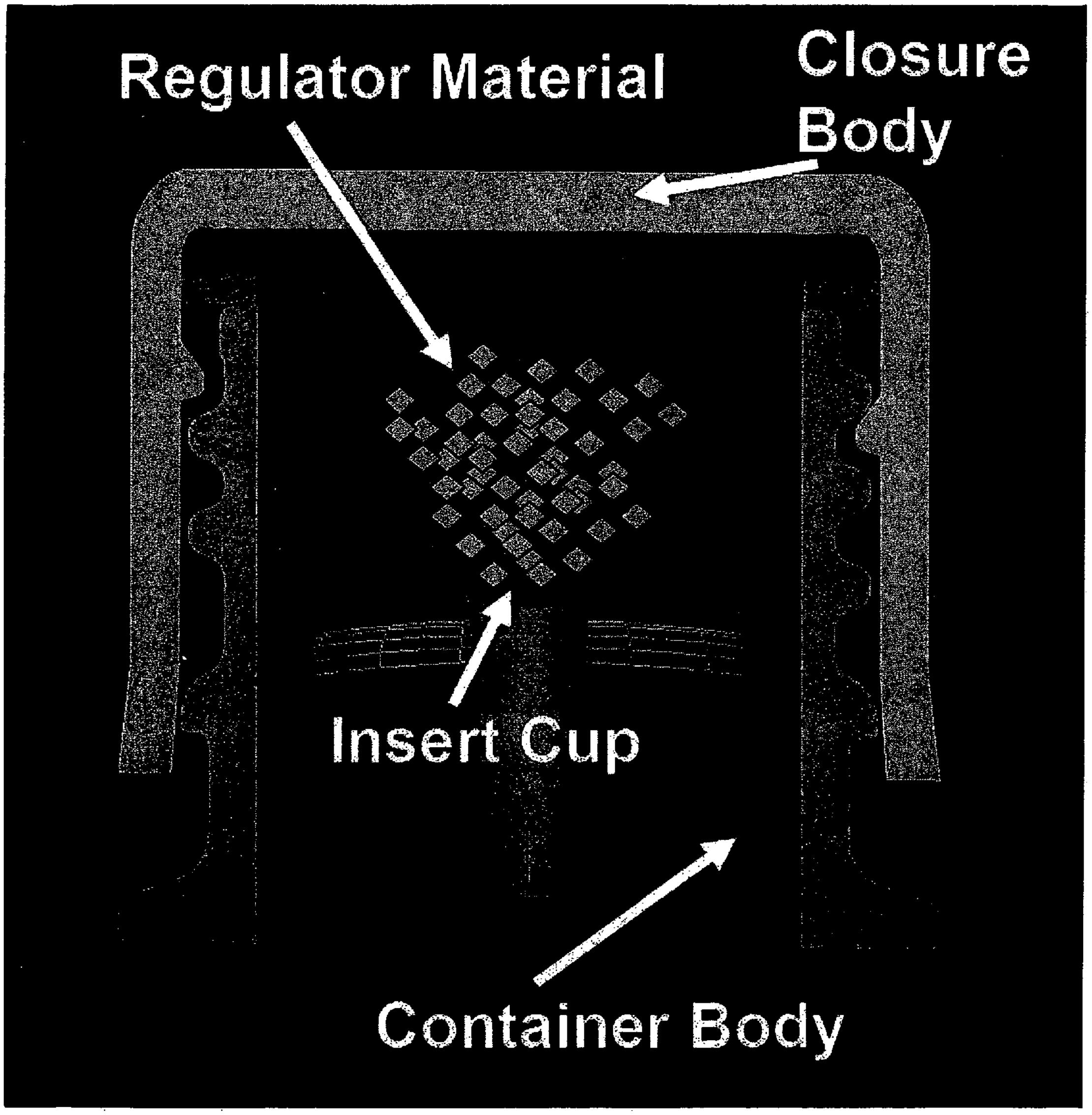
FIG. 4 is a depiction of a carbon dioxide regulator assembly with disk and liner.
Figure 5:
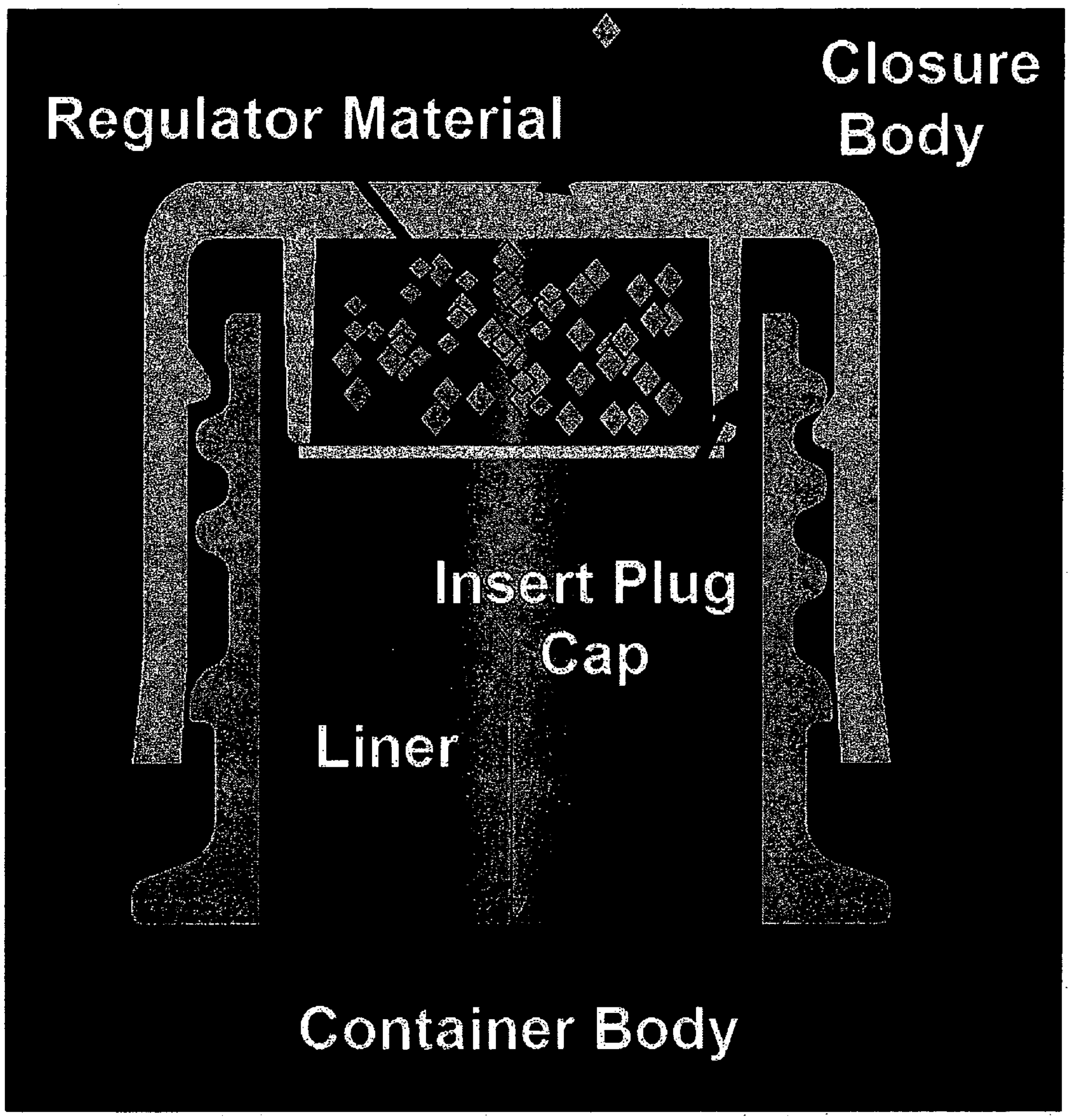
FIG. 5 is a depiction of a carbon dioxide regulator closure with inset plug assembly.

The carbon dioxide regulator may be incorporated into the package in any number of ways. These include, but are not limited to, placing it inside the closure either in a small cup or as a fabricated disk. These are illustrated in FIGS. 3-5. These designs have several components, the body of the closure, the carbon dioxide regulator material, and a liner or cup material which supports the carbon dioxide regulator and can separates it from the package contents. The liner material can be designed to assist in controlling the $CO_2$ loss rate of the carbon dioxide regulator material either by acting to control the $CO_2$ permeation rate directly or by controlling the rate at which an activator can reach the carbon dioxide regulator. Water and water vapor can act as an activator in many systems. The amount of carbon dioxide regulator can vary depending on the requirements of the package. For smaller increases in shelf-life a thin insert may be placed inside the closure. For larger effects, where more carbon dioxide regulator would be required, the cup or plug-closure design would allow large amounts of carbon dioxide regulator to be used.

Figure 6:
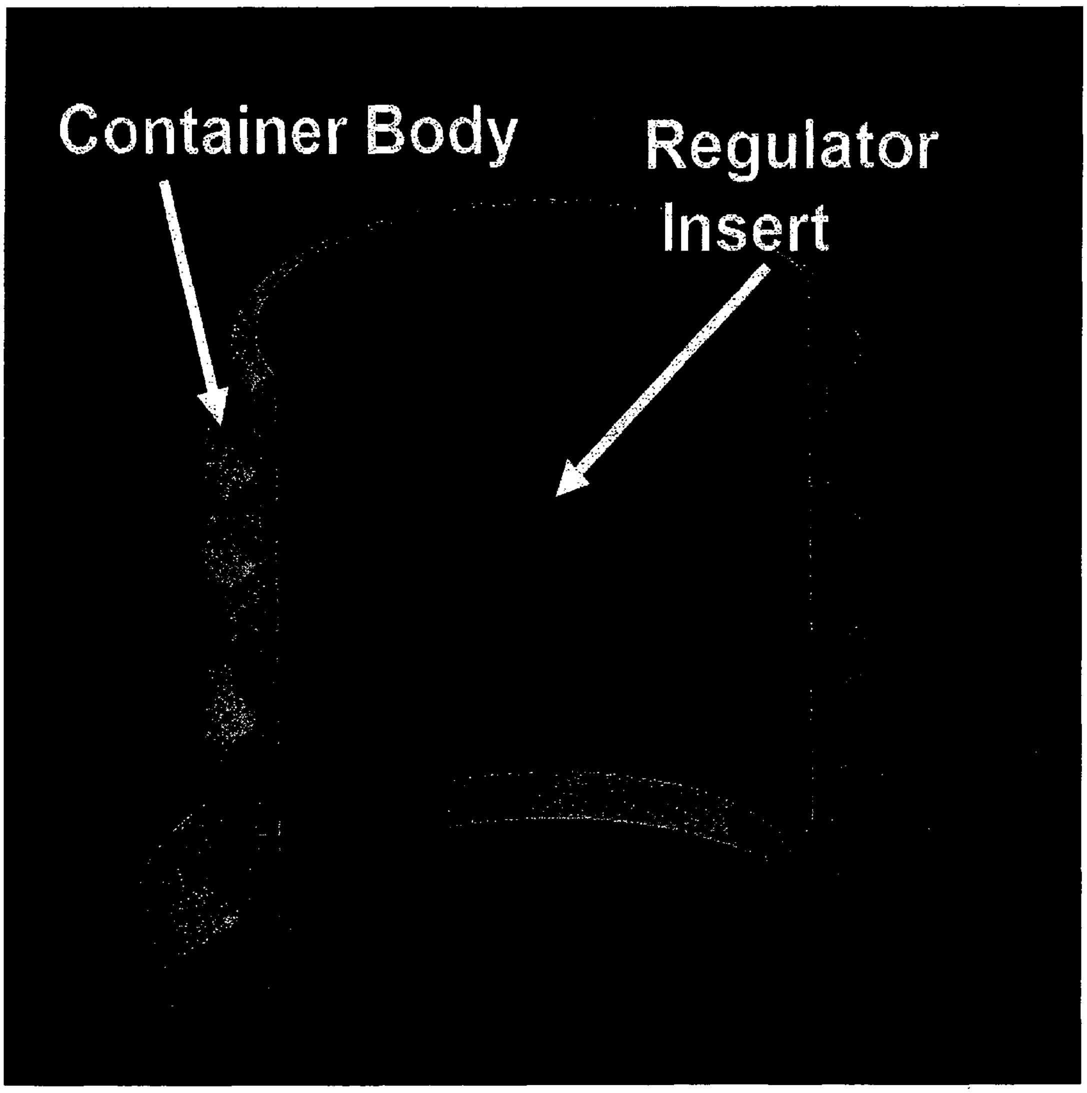
FIG. 6 is a depiction of a carbon dioxide regulator finish insert assembly.

The carbon dioxide regulator may be placed into the bottle after it is fabricated by placing a formed piece into a suitable position in the bottle. This is illustrated in FIG. 6. One approach would be a short tubular piece placed into a slot molded into the finish area of the bottle either during or after blow-molding. Another approach would be to over-mold a bottle preform around a carbon dioxide regulator assembly by placing the assembly on the core pin of a conventional injection mold and then over-molding a preform around this assembly using a polymer such as PET. The preform containing the carbon dioxide regulator assembly would then be blown into a bottle using conventional equipment. Another concept would be to use the stretch rod to position a regulator assembly into the bottle during blow-molding.

The carbon dioxide regulator can also be blended into the plastics used to form the body of the package or the closure. The preform containing the carbon dioxide regulator assembly would then be blown into a bottle using conventional equipment. For such a system, it would be advantageous if the carbon dioxide regulator would not become active until the package was filled.

The carbon dioxide regulator can also be added as a layer in a multilayer fabrication either as a layer in the bottle, a layer in the closure, or a layer in the liner. This layer may be made by any of the conventional multilayer extrusion and fabricating practices common in the industry including multilayer perform fabrication, multilayer film extrusion, coating, and laminating. The number of layers in the final package form may be from two to ten layers, and preferably three to five layers.

The release rate of carbonation from the carbon dioxide regulator can be further controlled by either laminating with a film, coating the carbon dioxide regulator assembly, or by blending the carbon dioxide regulator into another material, especially a plastic. This may also facilitate the fabrication of the carbon dioxide regulator into a form suitable for this application. One approach would include blending the carbon dioxide regulator material into the polymer used to form the closure liner or blending the carbon dioxide regulator material into the material used to produce the closure itself.

Molecular sieves are a preferred carbon dioxide regulator for this invention. Neat, uncompacted molecular sieves have the ability to absorb high levels of $CO_2$. The 13X molecular sieves absorb about 18% of their weight of $CO_2$ at bottle pressure. Thus, for a 12 oz carbonated soft drink bottle that is carbonated to 4.0 vol., about 0.525 g of $CO_2$ gas is required to replace the $CO_2$ that lost from the package and double the shelf life. Molecular sieves appropriate to act as carbon dioxide regulators include, but are not limited to, aluminosilicate materials commonly known as 13X, 3A, 4A, and 5A sieves, faujasite, and borosilicate sieves. These materials can be modified by ion exchange processes to modify their physical properties, and may be combined with fillers, binders, and other processing aids.

Another set of carbon dioxide regulators are coordination polymers, metal organic frameworks ("MOF's"), and isorecticular metal-organic frameworks (IRMOF's). These are polymeric structures made by the reaction of metal and organometal reagents with organic spacer molecules such than an open porous structure results. Any of the various related high porosity lattice systems prepared through such a reaction and that are capable of adsorbing and releasing carbon dioxide should be included.

Another set of carbon dioxide regulators include organic and inorganic carbonates. These materials react with water to form carbon dioxide especially in the presence of acid catalysts. Blending these materials into PET and activating them by filling the package with an acidic beverage is a preferred embodiment of our invention. Suitable inorganic carbonates would include sodium bicarbonate, calcium carbonate, and ferrous carbonate. Suitable polymeric carbonates would include cyclic carbonate copolymers such as poly(vinyl alcohol) cyclic carbonate and poly cyclic carbonate acrylate or linear aliphatic carbonate polymers. The poly(vinyl alcohol) cyclic carbonate is formed by the catalyzed reaction of poly vinyl alcohol with diethyl carbonate. A poly cyclic carbonate acrylate can be made by polymerizing the monomer, trimethylol propane carbonate acrylate, that is made from the catalyzed reaction between 2-ethyl-2-(hydroxylmethyl)-1,3-propanediol (trimethylpropane) and diethyl carbonate.

Another set of carbon dioxide regulators are polymers that oxidize to form carbon dioxide. One example of these would be aliphatic polyketones, example would include polymers made by the reaction of ethylene and/or propylene with carbon monoxide.

One of the parameters important to optimizing the present invention is maximizing the density of $CO_2$ in the $CO_2$ source. The higher the density of the source with respect to moles of $CO_2$ per unit volume, the more $CO_2$ can be incorporated into the package to extend shelf life, while at the same time minimizing the volume occupied by the source. A variety of materials and their $CO_2$ densities are shown in Table 1 below.

TABLE 1

Density of Carbon Dioxide Sources

| | Effective Density g/cc | $CO_2$ Density g/cc |
|---|---|---|
| Solid, $CO_2$ | | |
| Temp., C. = −80 | 1.565 | 1.565 |
| Liquid, $CO_2$ | | |
| Temp., C. = 0, Vap. Press. = 490 psig | 0.929 | 0.929 |
| Temp., C. = 25, Vap. Press. = 917 psig | 0.713 | 0.713 |
| Gaseous, $CO_2$ | | |

TABLE 1-continued

| Density of Carbon Dioxide Sources | | | | |
|---|---|---|---|---|
| Temp. C. = 0, Pressure = 44.07 psig | | 0.008 | 0.008 | |
| Sorbent | | | | |
| Sorption: 0.8 g/g for IRMOF-1 @−77 C. | | 0.620 | 0.496 | |
| Sorption: 0.18 g/g for 13× Mol Sieve Compacted @ 22 C. | | 0.766 | 0.139 | |
| Sorption: 0.022 g/g for Amorphous PET @ 22 C., 20 bar | | 1.335 | 0.030 | |
| Stoichiometric Pairs | | | | |
| Inorganic Carbonate | Acid | | | Ionization |
| sodium bicarbonate, $NaHCO_3$ | ascorbic acid, $C_6H_8O_6$ | 1.797 | 0.304 | mono |
| sodium bicarbonate, $NaHCO_3$ | benzoic acid, $C_7H_6O_2$ | 1.578 | 0.337 | mono |
| sodium bicarbonate, $NaHCO_3$ | citric acid, $C_6H_8O_7$ | 1.696 | 0.270 | mono |
| sodium bicarbonate, $NaHCO_3$ | fumaric acid, $C_4H_4O_4$ | 1.833 | 0.403 | mono |
| sodium bicarbonate, $NaHCO_3$ | maleic acid, $C_4H_4O_4$ | 1.799 | 0.396 | mono |
| sodium bicarbonate, $NaHCO_3$ | oxalic acid, $C_2H_2O_4$ | 1.836 | 0.384 | mono |
| sodium bicarbonate, $NaHCO_3$ | succinic acid, $C_4H_6O_4$ | 1.693 | 0.369 | mono |
| sodium bicarbonate, $NaHCO_3$ | terephthalic acid, $C_8H_6O_4$ | 1.688 | 0.297 | mono |
| Extra Strength Alka Seltzer, $NaHCO_3$ | Citric acid, non-stoichiometric | 1.574 | 0.121 | mono |
| Ferrous carbonate (iron(II)carbonate), CFeO3 | citric acid, $C_6H_8O_7$ | 2.040 | 0.275 | mono |
| Ferrous carbonate (iron(II)carbonate), CFeO3 | fumaric acid, $C_4H_4O_4$ | 2.353 | 0.414 | mono |
| lithium carbonate, $Li_2CO_3$ | citric acid, $C_6H_8O_7$ | 1.667 | 0.276 | mono |
| potassium bicarbonate, $KHCO_3$ | citric acid, $C_6H_8O_7$ | 1.712 | 0.258 | mono |
| sodium bicarbonate, $NaHCO_3$ | citric acid, $C_6H_8O_7$ | 1.792 | 0.438 | di |
| sodium bicarbonate, $NaHCO_3$ | fumaric acid, $C_4H_4O_4$ | 1.928 | 0.597 | di |
| calcium carbonate (calcite), $CaCO_3$ | citric acid, $C_6H_8O_7$ | 1.714 | 0.301 | di |
| calcium carbonate (calcite), $CaCO_3$ | DL-malic acid | 1.828 | 0.418 | di |
| calcium carbonate (calcite), $CaCO_3$ | dl-tartaric acid, $C_4H_6O_6$ | 1.886 | 0.398 | di |
| calcium carbonate (calcite), $CaCO_3$ | fumaric acid, $C_4H_4O_4$ | 1.885 | 0.476 | di |
| dolomite, $CaO.MgO.2CO_2$ | citric acid, $C_6H_8O_7$ | 1.815 | 0.28 | di |
| dolomite, $CaO.MgO\ 2CO_2$ | fumaric acid, $C_4H_4O_4$ | 2.020 | 0.427 | di |
| Organic Carbonate | | | | Hydration |
| ethylene carbonate, $C_3H_4O_3$ | | 1.344 | 0.671 | mono |
| propylene carbonate, $C_4H_6O_3$ | | 1.204 | 0.519 | mono |
| butylenes carbonate, $C_5H_8O_3$ | | 1.146 | 0.434 | mono |
| glycerine carbonate, $C_4H_6O_4$ | | 1.390 | 0.518 | mono |
| vinylene carbonate, $C_3H_2O_3$ | | 1.353 | 0.692 | mono |
| diethyl pyrocarbonate, $C_6H_{10}O_5$ | | 1.122 | 0.304 | mono |
| diethyl pyrocarbonate, $C_4H_6O_5$ | | 1.122 | 0.609 | di |
| dimethyl pyrocarbonate, $C_4H_6O_5$ | | 1.250 | 0.410 | mono |
| dimethyl pyrocarbonate, $C_4H_6O_5$ | | 1.250 | 0.820 | di |
| diethyl carbonate, $C_5H_{10}O_3$ | | 0.976 | 0.364 | mono |

Another challenge is regulating the release of $CO_2$ from the source so that it generally corresponds to the rate of loss of $CO_2$ from the package. $CO_2$ release may be optimized through selection of the source itself, controlling activation of the $CO_2$ releasing reaction or by appropriate selection of membranes, coatings or films separating the $CO_2$ source from the beverage. Various methods are explained in the Example section below.

Another parameter important to optimizing the present invention is the volume, or thickness, of the carbon dioxide regulator required to produce sufficient amounts of $CO_2$. In order to calculate the carbon dioxide regulator insert or thickness for a variety of reactant materials, a series of calculations are made assuming 100% conversion of the carbonate reactant to $CO_2$. In the case of di- or tri-functional organic acids, one or more of the acid groups might react, but for purposes of the calculations in the chart below, it is assumed that only one acid group reacts. The $CaCO_3$ and fumaric acid combination is included to demonstrate the effect of a more dense (higher yield of $CO_2$ per volume) reactant pair. Finally, ethylene carbonate is shown as an example of an organic source of carbonate, which decomposes upon reaction with water and does not require acidification. Table 2 below shows the effect of reactants on insert thickness.

TABLE 2

Effect of Reactants on Insert Thickness

| Bottle | Type | Reactant | Calc. Insert Thkns. |
|---|---|---|---|
| 12 oz. | CSD | 1 mol NaHCO3 + 1 mol Citric acid | 0.2889" |
| 12 oz. | CSD | 1 mol CaCO3 + 1 mol Fumaric acid | 0.1602" |
| 12 oz. | Beer | 1 mol NaHCO3 + 1 mol Citric acid | 0.1134" |
| 12 oz. | Beer | 1 mol CaCO3 + 1 mol Fumaric acid | 0.0628" |
| 12 oz. | Beer | ethylene carbonate | 0.0423" |
| 16 oz. | Beer | 1 mol NaHCO3 + 1 mol Citric acid | 0.0758" |
| 16 oz. | Beer | 1 mol CaCO3 + 1 mol Fumaric acid | 0.0420" |
| 16 oz. | Beer | ethylene carbonate | 0.0283" |

In the table above, mono-ionization is assumed and the total volume of the insert or disc is also increased by the addition of a non-reactive binding agent.

Some carbon dioxide regulators maybe pre-charged with $CO_2$ by subjecting it to an environment of $CO_2$ gas so that it absorbs and holds enough $CO_2$ gas to replace $CO_2$ lost from the container during the normal use of the container. Preferably, the $CO_2$ is released from the carbon dioxide regulator at a rate approximately equal to the rate of $CO_2$ permeation loss from the container.

One method of charging the carbon dioxide regulator with $CO_2$ is to place a disc or insert of the carbon dioxide regulator composition into the closure or finish of a carbonated drink bottle and then over-pressurizing the bottle with an amount $CO_2$ gas that is necessary to extend the container shelf life to the desired target. The excess $CO_2$ is then quickly absorbed by the carbon dioxide regulator so that the bottle is not unduly stressed. The sorbed $CO_2$ is then released into the headspace of the carbonated beverage as the vapor pressure of the $CO_2$ decreases when product $CO_2$ is lost from the package. Another method is to pre-charge the disk or insert of the carbon dioxide regulator with $CO_2$ and to place the pre-charged disk into the closure or finish during the bottling and/or capping process.

EXAMPLES

Example 1

Figure 7:
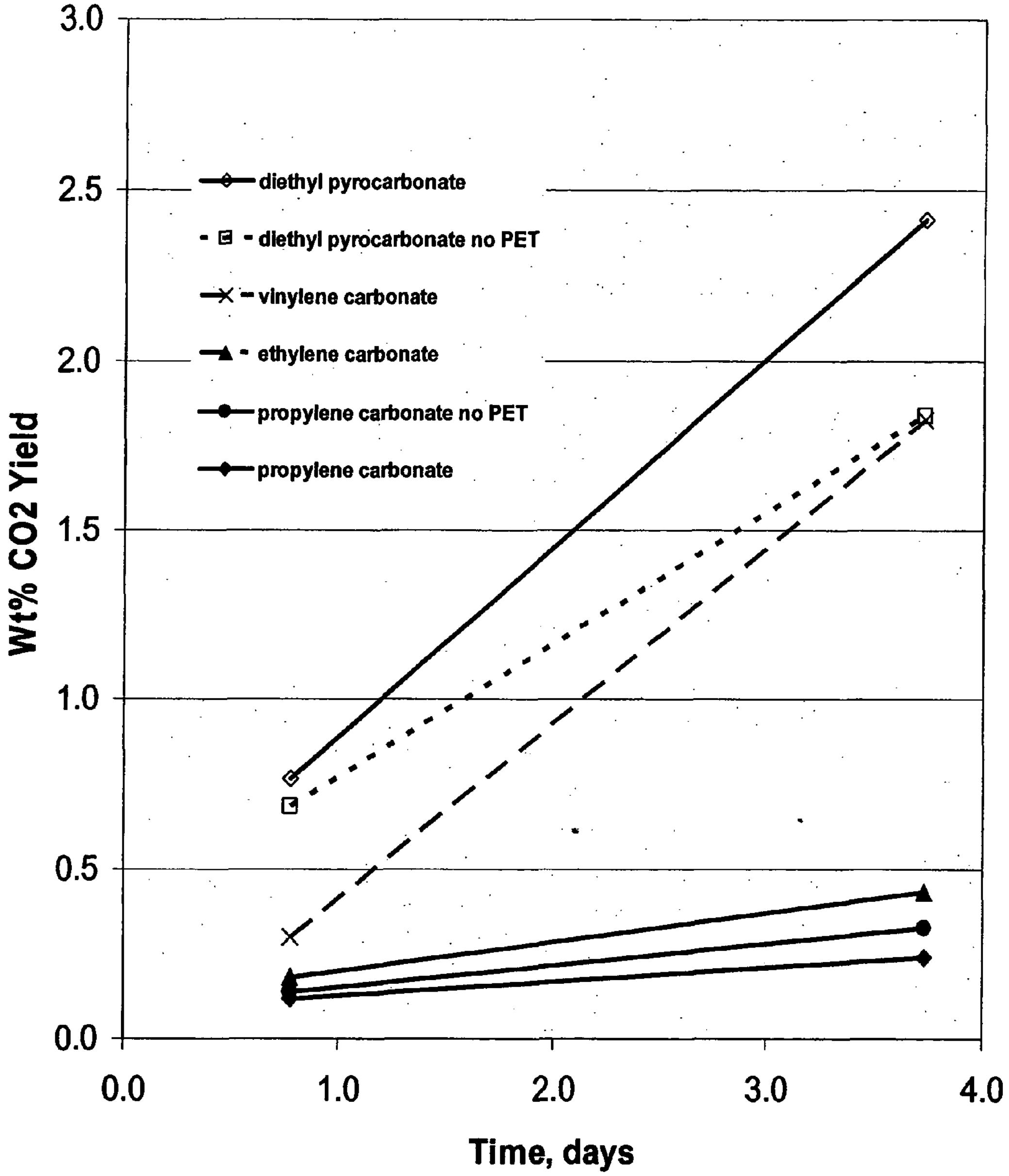
FIG. 7 is a depiction of carbon dioxide yield for an organic carbonate activated by water vapor.

Various carbon dioxide regulators, specifically organic carbonates, were tested to determine whether they could be activated by water vapor alone and without an organic acid present. The results shown in FIG. 7 illustrates that water vapor activates $CO_2$ production from organic carbonates by hydrolysis and an organic acid is not necessary.

Example 2

Figure 8:
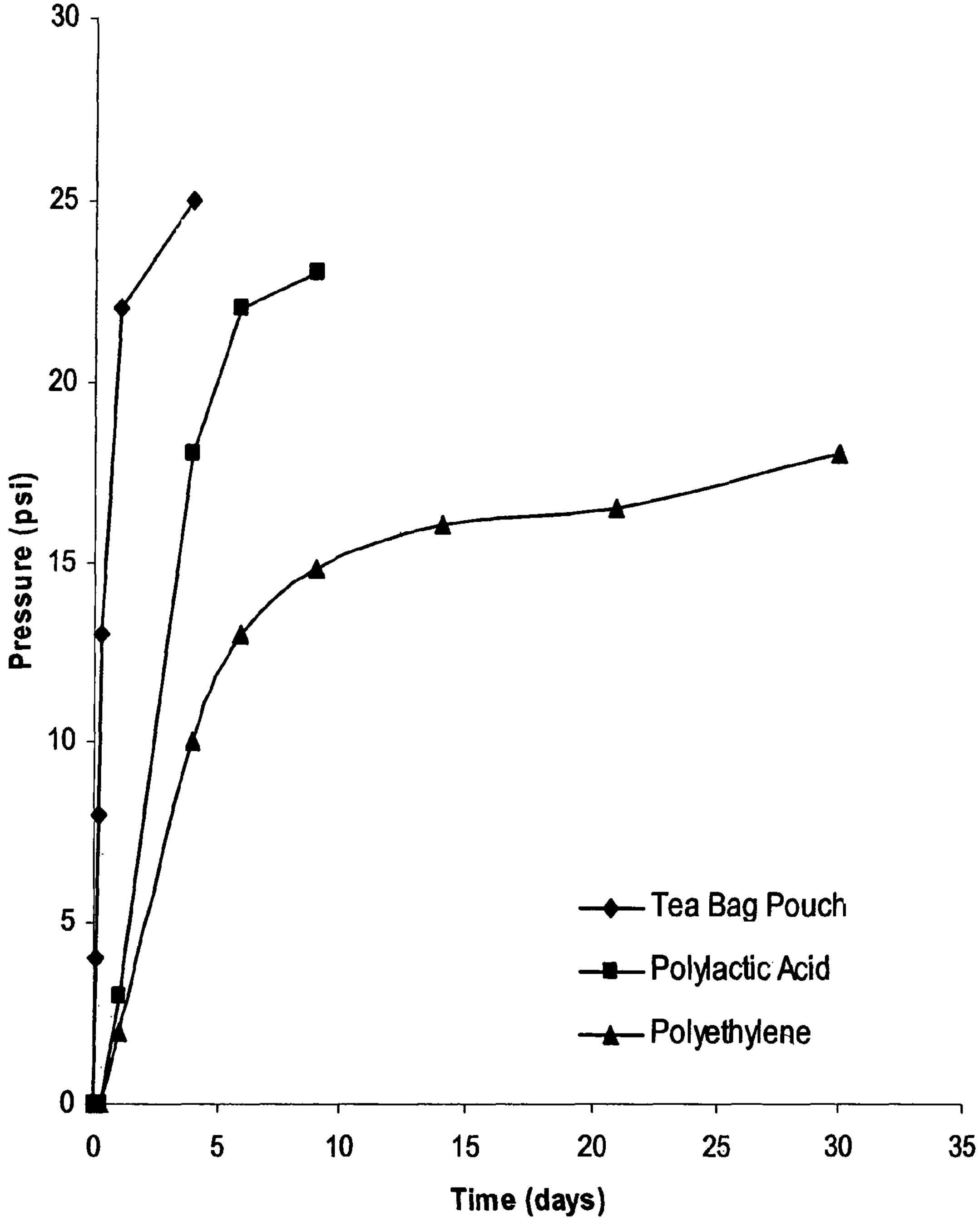
FIG. 8 is a depiction of the effect of bag sachet material on carbon dioxide release rate.

A variety of liner materials were tested to determine the effect of the permeability of the liner material on the rate of $CO_2$ production. A mixture of sodium bicarbonate and citric acid was sealed in a pouch suspended above 25 mL of water in a sealed bottle. The pouches were fabricated from three different materials with different permeabilities to moisture: a paper tea bag, polylactic acid and polyethylene. The results in FIG. 8 demonstrates that a very low moisture barrier allows the most rapid rate of $CO_2$ generation and the higher moisture barrier provided by the polyethylene provides the slowest rate. Thus, a moisture barrier material between the carbon dioxide regulator composition and the carbonated beverage can be used to control the rate of $CO_2$ production.

Example 3

Sorbent $CO_2$ Saturation and Release

Various carbon dioxide generators, in particular sorbent materials, were tested to determine their capacity to store and release $CO_2$ under high pressure and to thereby extend the shelf-life of a carbonated beverage. The selected sorbent materials were first saturated under a high pressure $CO_2$ environment. The sorbent materials were then placed into 20 oz bottles and the bottles were rapidly carbonated with dry ice and capped. The molecular sieves were obtained from commercial sources and either used as received or dried by heating under vacuum. The 13X molecular sieve discussed below was obtained from the Aldrich Chemical Company and either used as received or dried under vacuum prior to use. The rate of $CO_2$ loss from the bottles was recorded over time. The results are shown below in Table 3:

TABLE 3

Summary of the $CO_2$ Saturation Experiments

| Sample | % Shelf-Life Improvement |
|---|---|
| Control Bottles (no saturated additives) | — |
| Bottles w/8416 saturated film | 32.6% |
| Bottles w/4A Molecular Sieves | 104.2% |
| Bottles w/13X Molecular Sieves | 61.4% |
| Bottles pre-saturated @300 psig $CO_2$ | 0.2% |

The results demonstrate that the shelf-life of a carbonated beverage can be extended by placing $CO_2$ saturated articles inside the bottles and that molecular sieves are particularly effective regulators.

Experiment 4

Over-Pressurizing Bottles having Molecular Sieves with $CO_2$

An experiment was conducted to test the concept of over-pressurizing the bottle, storing the excess $CO_2$ in the molecular sieves and releasing the absorbed $CO_2$ back into the bottle head space. Four sets of 12 oz. bottles, each containing 15 cc of water and carbonated with dry ice, were tested. The first set was a control and was charged with 4.0 volumes of $CO_2$ only. The second set was charged with 4.75 volumes of $CO_2$ and about 3 grams of finely powered 13X molecular sieves dried under vacuum and contained in a test tube was also enclosed within the bottle. The third set was charged with 4.75 volumes of $CO_2$ and about 3 grams of un-dried finely powered 13X molecular sieves also contained in a test tube was enclosed within the bottle.

Figure 9:
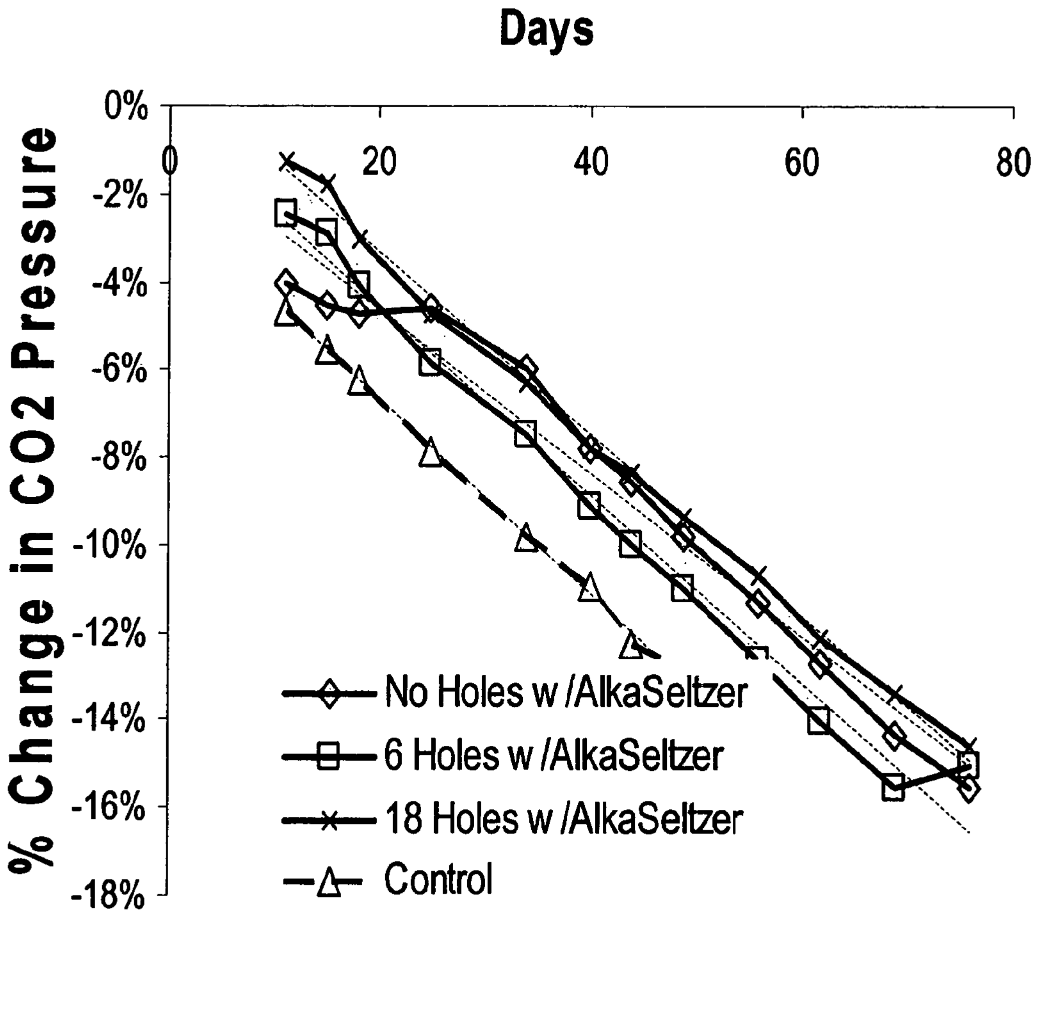
FIG. 9 is a depiction of carbon dioxide loss on internal bottle pressure.

The results shown in FIG. 9 shows that the control bottles lost $CO_2$ at a normal rate. However, the two sets that contained the molecular sieves showed an initial rapid drop in $CO_2$ pressure indicating that the $CO_2$ was absorbed by the molecular sieves. The $CO_2$ level in the headspace of the bottles then increased because the molecular sieves emitted the $CO_2$ back into the bottle. These two sets showed a theoretical increase of 11 weeks in shelf-life when compared to the control.

For the following examples, PET bottles were made by using conventional injection-blow molding procedures. They were made from a conventional PET bottle resin. The carbonated soft drink (CSD) bottles weighed 26.5 grams and had a volume of 12 ounces. The beer bottles used in the following examples had a weight of 37 grams, a volume of 500 mL, a champagne base, a 1716 finish, which is the neck and mouth of the bottle, and used a conventional CSD closure.

The effect of the carbon dioxide regulators on the internal pressure of PET bottles were conducted by placing a weighed amount of regulator sample into a test tube and placing it into the PET bottle. Ten milliliters of water were added to the bottle in such a way that only water vapor was in contact with the adsorbent. The bottles were then carbonated according to the method taught in U.S. Pat. No. 5,473,161. All test bottles were evaluated in triplicate.

The amount of carbon dioxide in the bottle was measured by FT-IR according to the method described by U.S. Pat. No. 5,473,161 under license from The Coca-Cola Company. This directly corresponds to the internal $CO_2$ pressure in the bottles. Measurements were made periodically to track the amount of $CO_2$ remaining in the package. A conversion factor for the signal was used to convert the FT-IR result to volumes of $CO_2$, a terminology commonly used in the packaging industry when describing the amount of carbonation in a carbonated beverage. One volume of $CO_2$ is the amount needed to give one atmosphere of pressure to the package at 20° C. The conversion constant was determined by placing a known amount of $CO_2$ into a bottle and measuring the $CO_2$ level within one hour of sealing. The conversion constant was determined at several pressures and found to be constant within the precision of our test.

Figure 2:
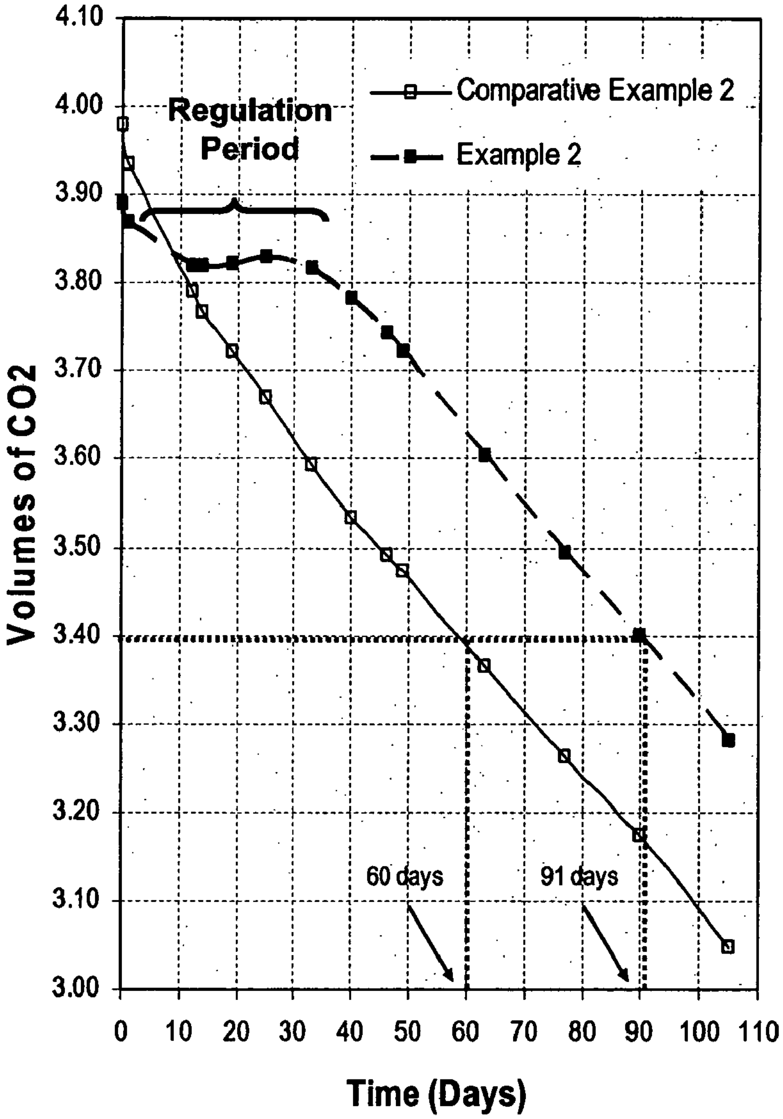
FIG. 2 is a depiction of the effect of a carbon dioxide regulator on the performance of a carbonated soft drink bottle.

Shelf-life is determined by the amount of time it takes the $CO_2$ pressure in the package to fall to a minimum acceptable value. The requirement varies by the product packaged. For carbonated soft drinks, an initial carbonation level of about 4.0 volumes is used with a minimum acceptable level of about 3.3-3.4 volumes. This is a loss of 15-17.5%. For beer, a minimum carbonation level is typically 2.7 volumes with an initial level of 3.0 volumes. The initial carbonation level for each test was determined by measuring the $CO_2$ level within the package shortly after sealing. In cases where the shelf-life was not reached when our experiment was terminated, the value was determined by extrapolation as shown in FIGS. 1 and 2. Most packages are used well before their ultimate shelf-life is reached.

Maintaining a very consistent carbonation level when the majority of the packages will be used is important for product quality. The period during which the internal $CO_2$ pressure stays relatively constant is defined as the regulation period. This is illustrated in FIGS. 1 and 2.

Comparative Example 5

A PET beer bottle with a 1716 finish and CSD closure was carbonated to a level of 3.3 volumes $CO_2$. This is a slightly higher initial carbonation level than typical of the industry. In beer, shelf-life is reached when the carbonation level reaches 2.7 volumes. Shelf-life and $CO_2$ loss rate results are shown in Table 4 and FIG. 2.

Comparative Example 6

A 12 ounce CSD bottle with a CSD closure was carbonated to a level of 4.0 volumes of $CO_2$. For soft drinks shelf-life is reached at 3.3-3.4 volumes of $CO_2$. Results are shown in Table 4.

Example 5

Effect of 13X Sieves on PET Beer Bottle Shelf-Life

One gram of dried 13X molecular sieve powder was placed in a test tube inside the same PET bottle-closure combination used in Comparative Example 5. $CO_2$ was added such that a carbonation level of 3.6 volumes of $CO_2$ would result in the absence of the adsorbent. Results are shown in FIG. 1 and Table 4. Carbonation was monitored until the minimum requirement for beer, 2.7 volumes $CO_2$ was reached. Placing the adsorbent inside the package resulted in an immediate reduction of measured. $CO_2$ within the bottle and the shelf-life of the package was extended 36 days more than Comparative Example 5.

Example 6

Effect of 13X Molecular Sieves on 12 Ounce CSD Bottle Shelf-Life

This experiment was conducted as Example 5 except a 12 ounce CSD bottle and CSD closure was used. One gram of dried molecular sieve powder was placed in a test tube inside the same PET bottle. $CO_2$ was added such that a carbonation level of 4.35 volumes would result in the absence of the adsorbent. Carbonation level was monitored over time. Results are shown in FIG. 2 and Table 4. Placing the adsorbent inside the package resulted in an immediate reduction of free $CO_2$ and the shelf-life of the package was extended by 42 days when compared to Comparative Example 6.

TABLE 4

Effect of Adsorbent on Shelf Life and Internal $CO_2$ Pressure Loss

| Example | Added Volume (Vol. $CO_2$) | Initial Volume Measured (Vol $CO_2$) | End Point (Vol $CO_2$) | Regulation Period (Days) | Time to Shelf-life (Days) |
|---|---|---|---|---|---|
| Comp. 5 | 3.30 | 3.34 | 2.7 | 0 | 80 |
| Comp 6 | 4.0 | 3.98 | 3.4 | 0 | 60 |
| Example 5 | 3.60 | 3.38 | 2.7 | 30 | 116 |
| Example 6 | 4.35 | 3.89 | 3.4 | 34 | 91 |

Comparison of Various Molecular Sieves

A variety of commercial molecular sieves (shown as individual letters in the tables below) were tested according to the procedure described above using one gram of molecular sieve. These materials were obtained from various manufacturers (shown as "Mfr" in the Tables below) and used as received. One gram of each materials was tested in twelve ounce CSD bottles with PCO (plastic closure only) finish at an added carbon dioxide volume of 4.5 volumes carbon dioxide. The initial carbon dioxide pressure was measured one hour after filling. Data on these molecular sieves are shown in Table 5.

TABLE 5

Shelf Life Extension with Various Molecular Sieves

| Source | Sieve Type | Added volume (Vol. CO2) | Initial Pressure (Vol. CO2) | Regulation Period (Days) | Shelf Life (Days) |
|---|---|---|---|---|---|
| 4.0 control | — | 4.0 | 4.0 | 0 | 62 |
| Aldrich | 13X | 4.5 | 4.1 | 44 | 102 |
| Mfr 1 | A | 4.5 | 4.2 | 44 | 114 |
| Mfr 1 | B | 4.5 | 4.2 | 44 | 110 |
| Mfr 2 | C | 4.5 | 4.2 | 44 | 100 |
| Mfr 2 | D | 4.5 | 4.3 | 44 | 100 |
| Mfr 3 | E | 4.5 | 4.1 | 44 | 110 |
| Mfr 3 | F | 4.5 | 4.2 | 44 | 110 |
| Mfr 3 | G | 4.5 | 4.3 | 44 | 114 |

The effect of drying temperature on carbon dioxide retention performance was also measured. Drying molecular sieves often increases their capacity for adsorption. Sieves were dried at 120° C. for 15.5 hours and tested as described above. Results are shown in Table 6.

TABLE 6

Peformance of Molecular Sieves After Drying at 120° C.

| Source | Sieve Type | Added volume (Vol. CO2) | Initial Pressure (Vol. CO2) | Regulation Period (Days) | Shelf Life (Days) |
|---|---|---|---|---|---|
| 4.0 control | — | 4.0 | 4.0 | 0 | 62 |
| Aldrich | 13X | 4.5 | 4.2 | 46 | 105 |
| Mfr 1 | A | 4.5 | 4.2 | 46 | 105 |
| Mfr 1 | B | 4.5 | 4.2 | 46 | 110 |
| Mfr 2 | C | 4.5 | 4.2 | 46 | 112 |
| Mfr 2 | D | 4.5 | 4.3 | 46 | 99 |
| Mfr 3 | E | 4.5 | 4.2 | 46 | 114 |
| Mfr 3 | F | 4.5 | 4.1 | 46 | 105 |
| Mfr 3 | G | 4.5 | 4.3 | 46 | 110 |

Sieves were dried at 240° C. and tested as described above. Results are given in Table 7.

TABLE 7

Effect of Drying Sieve at 240° C.

| Regulator Material | Added volume (Vol. CO2) | Initial Pressure (Vol. CO2) | Regulation Period (Days) | Shelf Life (Days) |
|---|---|---|---|---|
| No Regulator | 4.0 | 4.0 | 0 | 56 |
| No Regulator | 4.4 | 4.4 | 0 | 80 |
| 13X Sieve | 4.4 | 4.2 | 14 | 71 |

Effect of Surface Area on Performance

A sample of 13X sieve powder was ground using a Spex Mill grinder to decrease its particle size and increase its surface area. The surface area and particle size of the Aldrich 13X sieves before and after grinding is shown in Table 8.

TABLE 8

Surface Area and Particle Size of Aldrich 13X Sieves Before and After Grinding

| Measurement | Units | Original | Milled |
|---|---|---|---|
| Volume weighted mean diameter | microns | 5.91 | 8.45 |
| Surface weighted mean diameter | microns | 3.41 | 3.17 |
| Specific Surface Area | sq.m./g | 1.7618 | 1.8919 |

The performance of these materials was tested as described above using a twelve ounce CSD bottle with PCO finish and one gram of sieve. Results are shown in Table 9.

TABLE 9

Effect of Surface Area of Molecular Sieves on Carbonation Retention

| Regulator Type | Specific Surface Area (sq. m/g) | Added volume (vol $CO_2$) | Initial Pressure (Vol $CO_2$) | Regulation Period (Days) | Shelf Life (Days) |
|---|---|---|---|---|---|
| No Regulator | — | 4.0 | 4.0 | 0 | 56 |
| 13X Sieve | 1.7618 | 4.5 | 4.3 | 44 | 140 |
| 13X Sieve | 1.8919 | 4.5 | 4.1 | 44 | 140 |

Effect of Molecular Sieves in Tablet Form

Molecular sieves were pressed into pellets and tested either by exposing the tablet to the vapor space of the bottle or by immersing the tablet in water inside the container. Results are shown in Table 10.

TABLE 10

Comparison of Molecular Sieve Tablets and Powder

| Regulator Type | Sieve Form | Added volume (vol $CO_2$) | Initial Pressure (Vol $CO_2$) | Regulation Period (Days) | Shelf Life (Days) |
|---|---|---|---|---|---|
| No Regulator | — | 4.0 | 4.0 | 0 | 62 |
| 13X Sieve | Powder | 4.5 | 4.1 | 46 | 102 |
| 13X Sieve | Tablet | 4.5 | 4.1 | 46 | 104 |

Effect of Coatings to Modify Performance of Sieve Tablets

Molecular sieve tablets were prepared by compression and dried at 125° C. They were coated with a 2% solution of General Electric Silicone RTV615A 01P by mixing 10 parts of elastomer with 1 part curing agent, in heptane. Tablets were dipped in the coating and allowed to air dry at room temperature. The coated and uncoated tablets were placed in the headspace of a twelve ounce CSD bottle and tested as described above, and the results are shown in Table 11.

TABLE 11

Effect of Silicone Coating on Tablet Performance

| Regulator Type | Sieve Form | Coating | Add $CO_2$ (vol $CO_2$) | Initial Pressure (Vol $CO_2$) | Regulation Period (Days) | Shelf Life (Days) |
|---|---|---|---|---|---|---|
| No Regulator | — | — | 4.0 | 4.0 | 0 | 62 |
| 13X Sieve | Tablet | Uncoated | 4.5 | 4.0 | 46 | 102 |
| 13X Sieve | Tablet | Coated | 4.5 | 4.1 | 40 | — |

Effect of Molecular Sieves in Closure Inserts

A small insert was prepared by injection molding a cup which would fit inside the closure and also act as the liner seal mechanism. This cup was designed to contain 1 g of the molecular sieve material and fit inside of the finish of a twelve ounce CSD bottle. These cups were injection molded from polyethylene and polypropylene and the carbonation retention performance of molecular sieves placed into these cups was tested as described above. Data is shown in Table 12.

TABLE 12

Effect of Placing Molecular Sieves in Closure Inserts

| Regulator Material | Cup Material | Add $CO_2$ (Vol. $CO_2$) | Initial Pressure (Vol. $CO_2$) | Regulation Period (Days) | Shelf Life (Days) |
|---|---|---|---|---|---|
| No Regulator | No Cup | 4.0 | 4.0 | 0 | 62 |
| No Regulator | No Cup | 4.5 | 4.5 | 0 | 98 |
| No Regulator | 70-7931 | 4.5 | 4.5 | 0 | 100 |
| No Regulator | 955I | 4.5 | 4.4 | 0 | 92 |
| 13X Sieve | 70-7931 | 4.5 | 4.2 | 20 | 76 |
| 13X Sieve | 955I | 4.5 | 4.2 | 0 | 82 |

Note:
70-7931 is polypropylene obtained from BP
955I low density polyethylene obtained from Dow Chemical.

Comparison of Molecular Sieves with Ascarite

The performance of 13X molecular sieves and Ascarite, a carbon dioxide adsorbing mineral, are compared as described above using 1 g of each material. Results are shown in Table 13.

TABLE 13

Comparison of Carbonation Retention of Molecular Sieves and Ascarite

| Regulator Form | Add $CO_2$ (vol. $CO_2$) | Initial Pressure (Vol. $CO_2$) | Regulation Period (Days) | Shelf Life (Days) |
|---|---|---|---|---|
| No Regulator | 4.0 | 4.0 | 0 | 62 |
| Ascarite | 4.5 | 4.5 | 0 | 44 |
| 13X Sieve | 4.5 | 4.5 | 44 | 108 |

Acid Activated Regulator Systems

A convienent method of regulating $CO_2$ release would be through contact of the package with the beverage. Many carbonated soft drinks are quite acidic, thus making acidity a convenient trigger for $CO_2$ release from a carbon dioxide regulator incorporated into a PET bottle or closure. Common acids found in beverages include phosphoric acid and citric acid.

Suitable carbon dioxide regulators for this concept would include inorganic carbonates such as calcium carbonate, organic carbonate oligomers and polymers, such as shown in Table 14, and combinations thereof. The inorganic carbonates and organic carbonates oligomers were obtained from Aldrich Chemical Company. Cyclic carbonate polymers were obtained from Prof. Morton H. Lift of the Department of Macromolecular Science and Engineering at Case Western Reserve University.

Figure 10:
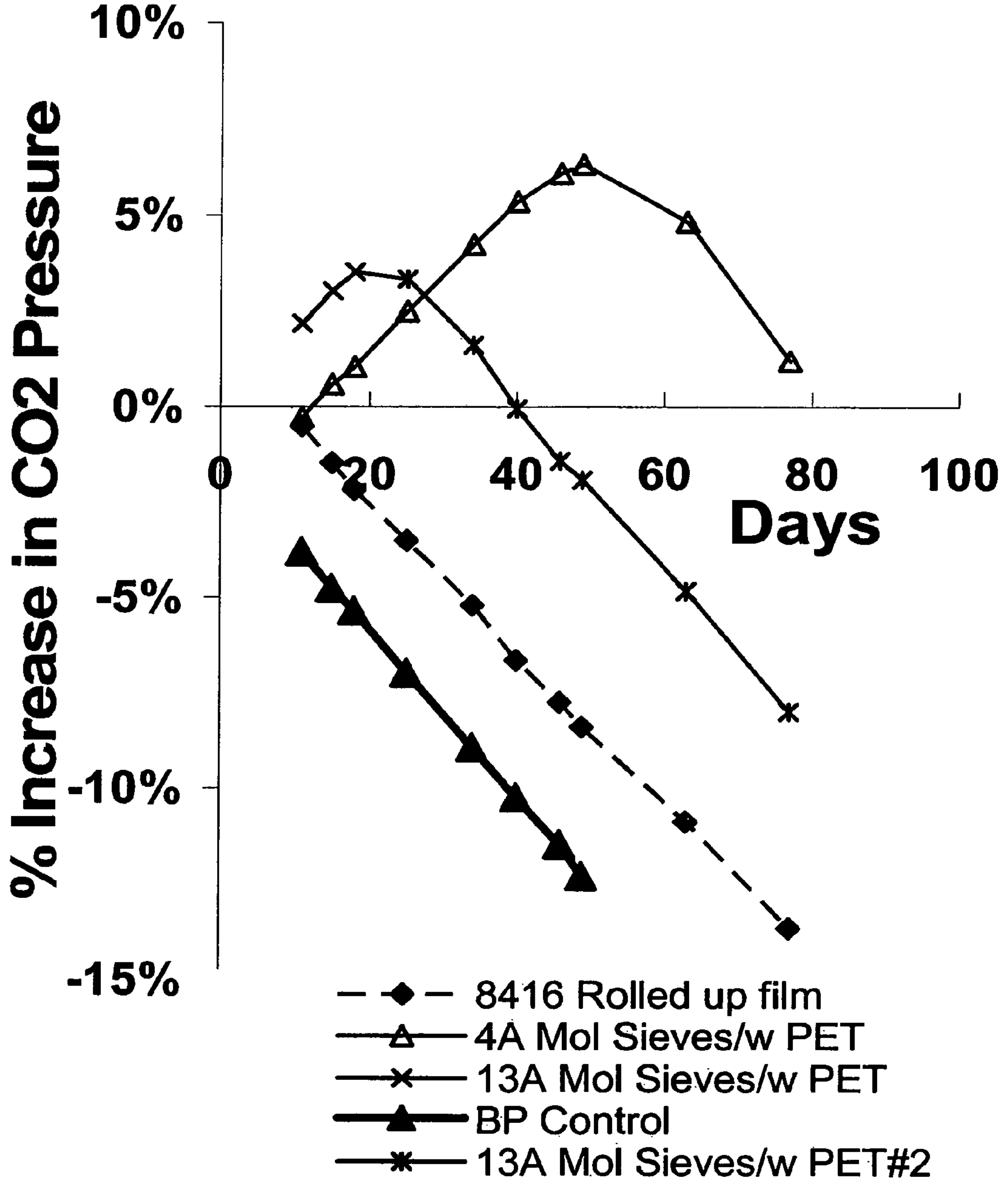
FIG. 10 is a depiction of presaturation of carbon dioxide in 20 ounce bottles.

PET was dry blended with various sources of carbon dioxide and compounded on a APV lab scale twin-screw extruder to form a water quenched strand. Approximately three grams of material was placed in a pH 2 solution of phosphoric acid in a 155 ml headspace vial and sealed with a crimp top silicone gasket. The generation of carbon dioxide was monitored by GC. The ml's of carbon dioxide generated per gram of regulator material per day is shown in Table 14. The approximate amount of regulator required to match the $CO_2$ release rate for a conventional 12 ounce carbonated soft drink container is also indicated.

for 36 hours. 29 grams of film were allotted to each bottle. The PET film was saturated with $CO_2$ at room temperature for 36 hours at 300 psig. The film absorbed 0.99 grams of $CO_2$ on average. The film was placed in PET bottles (6) and the internal level of $CO_2$ monitored. The $CO_2$ that evolved from the PET film extended the shelf life as shown in FIG. 10.

Further Discussion of Examples 5 and 6

Placing a suitable adsorbent inside a PET carbonated beverage bottle allows additional $CO_2$ to be added without causing an increase in the internal pressure of the bottle. This is readily seen for Examples 5 and 6. For Example 5, $CO_2$ was added to create a carbonation level of 3.6 volumes but after sealing only 3.38 volumes was measured. In Example 6, 4.35 volumes were added but only 3.89 volumes were measured within one hour after sealing. In each case, $CO_2$ was rapidly adsorbed preventing the over-carbonation from affecting the bottle.

TABLE 14

Rate of $CO_2$ Release From PET Blends

| Sample | Carbonate Wt % | Molecular Sieve Wt % | PET Wt % | Temperature, C. | $CO_2$ Production, ml/g regulators/day | Amount to meet target, g |
|---|---|---|---|---|---|---|
| Filled PET | | | | | | |
| 13X Molecular Seive Powder in PET | 0 | 5 | 95 | 22 | 0.55 | 7.4 |
| butylene carbonate in PET | 5 | 0 | 95 | 22 | 0.39 | 10.5 |
| butylene carbonate in PET with 13× | 5 | 5 | 91 | 22 | 0.25 | 16.5 |
| diethyl pyrocarbonate in PET | 4 | 0 | 96 | 22 | 1.92 | 2.1 |
| diethyl pyrocarbonate in PET with 13× | 4 | 5 | 91 | 22 | 0.39 | 10.5 |
| glycerine carbonate in PET | 4 | 0 | 96 | 22 | 0.54 | 7.6 |
| propylene carbonate in PET | 5 | 0 | 95 | 22 | 0.52 | 7.9 |
| propylene carbonate in PET with 13× | 5 | 5 | 91 | 22 | 0.37 | 11.1 |
| sodium bicarbonate, NaHCO3 in PET | 5 | 0 | 95 | 22 | 8.13 | 0.5 |
| sodium bicarbonate, NaHCO3 in PET with 13× | 5 | 5 | 91 | 22 | 8.76 | 0.5 |
| vinylene carbonate in PET | 1 | 0 | 99 | 22 | 2.35 | 1.8 |
| butylene carbonate in PET | 5 | 0 | 95 | 52.2 | 0.69 | 6.0 |
| diethyl carbonate in PET with 13× | 5 | 5 | 91 | 52.2 | 0.72 | 5.7 |
| vinylene carbonate in PET | 1 | 0 | 99 | 52.2 | 7.60 | 0.5 |
| Cyclic Carbonate polymer | 5 | 0 | 95 | 23 | 0.13 | 30.9 |
| Cyclic Carbonate polymer | 5 | 0 | 95 | 22 | 0.15 | 27.4 |

Effect of Presaturation

Tablets of 4A extruded pellets with PET as a binder were prepared and saturated. 11.3 grams of 4A sieve was used with 4.8 grams of PET. The two materials were blended together, and formed into a cylindrical compact in a pressure press at 10000 psig and approximately 100 to 120° C. The tablets were saturated in CO2 at room temperature and 300 psig for 36 hours. The tablets adsorbed 1.47 grams of CO2 on average. The tablets had been cut in half to allow them to be put into the bottles. The bottles (6) were closed and monitored. The FIG. 10 shows that the shelf life was extended with the 4A presaturated material. A maximum in the CO2 level in the bottle occurred part way through the test that reveals the slow process of CO2 evolution from the 4A material.

Tablets of 13X were prepared by a similar process. 3.2 grams of powdered 13X (Aldrich as for the 4A) and 4.8 grams of PET were formed into tablets, cut in half, and saturated with $CO_2$ at room temperature, 300 psig for 36 hours. The saturated pellets were placed in PET bottles and the $CO_2$ levels monitored. The shelf life was extended by the additional $CO_2$. The tablets had adsorbed 0.52 grams of $CO_2$ on average.

PET film, 5.25 inches square, 10 mil thick, and unstretched, were saturated at room temperature and 300 psig The adsorbed $CO_2$ was then released into the bottle slowly over time resulting in a much more constant $CO_2$ pressure inside the package. The regulation period was thirty and thirty-four days for examples 5 and 6 respectively. This is well within the period of time in which most high volume carbonated beverages are packaged and sold.

The ultimate shelf-life for examples 5 and 6 is significantly longer than seen in the comparative examples. The shelf-life was extended by over thirty days in each case. A variety of different molecular sieves were evaluated as a basis for a carbon dioxide regulator. As illustrated in Table 5, we found a wide variety of materials to be effective.

We examined the effect of drying temperature on carbon dioxide regulator performance. We found that it was not necessary to dry molecular sieve based regulators to achieve excellent performance and that drying them to a temperature lower than conventionally used to dry these materials, 120° C., gave some improvement in performance. Drying at higher temperature, 240° C., resulted in a significant decrease in the regulation period. Avoiding the need to dry the sieves prior to used would be very advantageous in a number of carbon dioxide regulator designs.

Increasing the particle size and surface area of the adsorbent resulted in a significant increase in the amount of $CO_2$ which a carbon dioxide regulator could adsorb as shown in Table 5. Optimizing particle size and surface area for a particular carbon dioxide regulator would be a matter of routine experimentation.

The physical form of the regulator will be important in developing an optimized carbon dioxide regulator design. We found that molecular sieves pressed into the form of a tablet could be just as effective a regulator as molecular sieve powder. Optimization of the form and shape of the regulator is again a matter of routine experimentation.

Coating a molecular sieve tablet is expected to be a particularly effective method of producing a regulator. A critical feature of this coating would be to allow the rapid adsorption of $CO_2$ during bottle filling to facilitate over-pressurization as a method for introducing additional carbon dioxide. We found silicone coatings to be effective as shown in Table 11.

An insert cup assembly represents one practical method for producing a carbon dioxide regulator system. We found that polyethylene based insert cups could to be effective as illustrated in Table 12. Other polyolefins suitable for such assemblies would include thermoplastic polyolefin elastomers, ethylene copolymers, such as linear low density polyethylene, and ultralowdensity polyethylene, ethylene-propylene copolymers, propylene copolymers, and styrene thermoplastic elastomers. Softer polyolefins materials capable of forming a tight seal with the surface of the package would be preferred. Determining the optimized dimensions and materials for an insert cup or other regulator form is a matter of routine experimentation.

Many materials which adsorb carbon dioxide do not readily form regulator systems as is illustrated in Table 13. Ascarite is a mineral which readily adsorbs large quantities of carbon dioxide but does not in its pure form produce a suitable carbon dioxide regulator since the $CO_2$ is not released at a rate similar to the rate of $CO_2$ loss from the package.

There are a number of factors that one skilled in the art realizes would further enhance this invention. It is advantageous that the adsorbents have as high a capacity to adsorb carbon dioxide as possible. Capacity is the weight of carbon dioxide adsorbed per the weight of the adsorbent. Adsorbents with higher $CO_2$ adsorption capacity would be preferred since less would need to be added to the package to generate the desired shelf-life improvement.

The conditions under which these are handled can also be important. It is well known that heating molecular sieves can remove trapped species and create more capacity. Surprisingly, over-drying impairs the performance of these materials as a $CO_2$ regulator.

The molecular sieve may need to be combined with a binder material to facilitate its fabrication into parts suitable for this application. The type needed would depend on the properties of the sieve and the final properties needed in the final fabricated piece. They would include inorganic binders regularly used to improve the mechanical properties of molecular sieves, organic polymers in which the adsorbent may be blended and lower molecular weight resins and oligomers in which the adsorbent could be dispersed. These could be thermoset or thermoplastic in nature and can include materials such as silicone rubbers, polyolefins, epoxies, unsaturated polyesters, and polyester oligomers.

It is important to control the rate at which adsorbed $CO_2$ is released from the adsorbent and to prevent liquid water from causing a sudden release of adsorbed $CO_2$, to prevent the removal of sensory components of the beverage, or to permit components of the package to contact the regulator in a controlled way. This can be done by either placing the adsorbent into a polymer with a low permeability for water or placing a thin film of such a polymer between the beverage and the adsorbent material. This material would need to allow $CO_2$ to readily adsorb the over-carbonation and could be comprised of a semi-permeable membrane, a permeable membrane or a material with a high $CO_2$ permeability and their combinations. Suitable materials include polyolefins such as low density polyethylene, high density polyethylene, polypropylene, ethylene-propylene elastomers, ethylene-vinyl acetate copolymers, and silicone rubbers. Suitable membrane materials would include liquid impermeable/vapor permeable materials such as Gore-Tex or similar structures. Especially preferred embodiments of our invention are blending the adsorbent into a suitable polymer and: using this to fabricate the bottle closure itself, inserting a fabricated disk of adsorbent into the closure behind the closure liner, protecting a tubular insert with a thin film or coating of $CO_2$ permeable polymer or molding a tubular insert from a combination of adsorbent and $CO_2$ permeable polymer. The preferred method of placing the adsorbent into the bottle and optimizing its performance is a matter of further experimentation.

Carbon dioxide regulators can also be formed by blending $CO_2$ releasing materials into PET as is shown in Table 14. For such a carbon dioxide regulator, it is critical that the $CO_2$ release not occur prior to filling of the package so that carbon dioxide regulator performance is not lost in bottle storage. A variety of inorganic and organic carbonates can be blended into PET at concentration below 20% by weight and preferably under 10% by weight and achieve a rate of $CO_2$ release equivalent to the $CO_2$ loss rate of a conventional PET package. These are activated by exposing to water with a pH range similar to many carbonated soft drinks.

One aspect of this invention is to allow carbonated beverages to be stored for longer periods in hot locations without the need for more expensive coatings or cold storage conditions. In hot locations, storage temperature can be quite high and since the permeability of bottles for carbon dioxide is proportional to temperature, CO2 loss rates are higher. Also, due to these temperatures the internal pressure inside the bottle can reach dangerous levels. Thus, a system which can maintain a stable and consistent internal pressure and increase shelf-life is particularly advantageous.

Another aspect of this invention is to allow for lightweighting of current carbonated beverage bottles and maintain their current shelf-life. The rate of permeation of a package is inversely proportional to the thickness of the package wall. It is economically advantageous to make packaging as light-weight as possible which results in wall thickness being reduced. A system which extends shelf-life of conventional packaging will be able to give thinner walled packaging a shelf-life equivalent to that of conventional packaging. Many of the bottles in applications that this technology is directed toward are in packages that cannot be lightweighted further without a further loss in shelf-life or through the use of more expensive bottle fabrication techniques.

Another aspect of this invention is to permit the maintaining of a more optimum and stable carbonation level for longer periods of time thus yielding a more consistent product taste and quality. The amount of dissolved carbon dioxide in a beverage is proportional to the carbon dioxide pressure in the container. Dissolved carbon dioxide concentration effects pH and other properties of the beverage. A stable amount of dissolved carbon dioxide will equate to a more consistent taste of the beverge product.

Another aspect of this invention is the control of the rate of release of carbon dioxide and that this release rate not materially exceed the permeation rate of the package. Over-pressurization of carbonated beverage bottles is a significant problem and can lead to rupture of the package, an economic and safety consideration. Any effective $CO_2$ regulating system for a carbonated beverage bottle must not release carbon dioxide at a rate significantly greater than the rate of $CO_2$ loss from the package. Ideally, the release rate should be equal to or slightly less than the permeation rate from the package and should not exceed a rate of 125% of the rate of permeation of the package. It must also be able to release the $CO_2$ consistently over a prolonged period of time ideally over a period of up to three months and for at least two weeks.

Another aspect of this invention is that it is self-regulating with respect to the thermal environment of the package such that in a warmer environment when the carbonation losses are higher, the regulators naturally release higher amounts of carbon dioxide that replenish the losses.

Another aspect of this invention is to provide a packaging system which can allow over-carbonation without increasing the pressure inside the package and allow lighter weight bottles to be acceptable for holding carbonated beverages. Adding extra carbonation at the point of filling is a very economical method for extending the shelf-life of carbonated beverages and is used today in the packaging of soft drinks and beer. It is limited by the ability of the package to maintain this higher initial pressure level. A system which adsorbs- and re-releases this carbon dioxide will expand the amount of over-carbonation which can be done during filling and will facilitate the use of vessels with a lower pressure resistance.

Carbon dioxide regulation will also facilitate the use of containers which have lower modulus. Many plastics are not suitable for packaging carbonated beverages because they cannot contain the high internal pressures which can develop with carbonated soft drinks. An example are polyolefins such as polypropylene. The use of a carbonation regulator with a lower modulus plastic such as polypropylene could allow it to be more generally useful for packaging of carbonated beverages.

This invention has been described for the purposes of illustration only in connection with certain embodiments. However, it is recognized that various changes, additions, improvements, and modifications to the illustrated embodiments may be made by those persons skilled in the art, all falling within the scope and spirit of the invention.

We claim:

1. A method for replenishing carbon dioxide gas in a closed and sealed carbonated beverage container holding a beverage comprising i. Inserting a carbon dioxide regulator into said container or into a closure of said container wherein the insertion occurs so that said carbon dioxide regulator does not come into contact with said carbonated beverage and wherein said carbon dioxide regulator is a sorbent that is capable of absorbing and releasing carbon dioxide gas while in the container and in the presence of said beverage; and ii. Regulating the release of carbon dioxide from said carbon dioxide regulator in (i) for a period of at least two weeks at a rate approximately equal to the rate of carbon dioxide loss from said container.

2. The method of claim 1 wherein said carbon dioxide regulator may optionally be pre-charged with carbon dioxide prior to inserting said carbon dioxide regulator into said container.

3. The method of claim 1 wherein said carbon dioxide regulator may optionally be charged by placing an insert of said carbon dioxide regulator into a closure or finish of said container and subsequently overpressurizing said container with a suitable amount of carbon dioxide.

4. The method of claim 1 wherein said carbon dioxide regulator comprises materials that absorb and subsequently releases carbon dioxide.

5. The method of claim 4 wherein said carbon dioxide regulator comprises molecular sieves.

6. The method of claim 4 wherein said carbon dioxide regulator comprises silica gels, molecular sieves, clays, activated alumina, zeolites, coordination polymers, metal organic frameworks, and isoreticular metal organic frameworks.

7. The method of claim 1 wherein said carbon dioxide regulator may be blended directly into the material used to form the body of said container or said closure.

8. The method of claim 1 (ii) wherein the release of carbon dioxide from said carbon dioxide regulator is for a period of three months.

9. The method of claim 1 wherein the amount of carbon dioxide inside the carbonated beverage container is maintained in the range of about 2 to about 5 vol $CO_2$/vol $H_2O$.

10. The method of claim 8 wherein the amount of carbon dioxide inside the carbonated beverage container is maintained in the range of about 2 to about 5 vol $CO_2$/vol $H_2O$.

* * * * *